United States Patent
Sugiyama et al.

(10) Patent No.: US 12,548,982 B2
(45) Date of Patent: *Feb. 10, 2026

(54) QUANTUM CASCADE LASER ELEMENT AND QUANTUM CASCADE LASER DEVICE

(71) Applicant: HAMAMATSU PHOTONICS K.K., Hamamatsu (JP)

(72) Inventors: Atsushi Sugiyama, Hamamatsu (JP); Tadataka Edamura, Hamamatsu (JP); Naota Akikusa, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 698 days.

This patent is subject to a terminal disclaimer.

(21) Appl. No.: 17/914,525

(22) PCT Filed: Mar. 25, 2021

(86) PCT No.: PCT/JP2021/012673
§ 371 (c)(1),
(2) Date: Sep. 26, 2022

(87) PCT Pub. No.: WO2021/200583
PCT Pub. Date: Oct. 7, 2021

(65) Prior Publication Data
US 2023/0132974 A1 May 4, 2023

(30) Foreign Application Priority Data
Apr. 2, 2020 (JP) ................................. 2020-066858

(51) Int. Cl.
*H01S 5/34* (2006.01)
*H01S 5/026* (2006.01)
(Continued)

(52) U.S. Cl.
CPC ............ *H01S 5/3401* (2013.01); *H01S 5/026* (2013.01); *H01S 5/04256* (2019.08); *H01S 5/2275* (2013.01)

(58) Field of Classification Search
CPC ........ H01S 5/223; H01S 5/227; H01S 5/3401; H01S 5/3402; H01S 5/04254; H01S 5/04256
See application file for complete search history.

(56) References Cited

U.S. PATENT DOCUMENTS 4,677,634 A * 6/1987 Meuleman ............... H01S 5/227
372/46.01
4,870,468 A * 9/1989 Kinoshita ............... H01S 5/227
148/DIG. 95
(Continued)

FOREIGN PATENT DOCUMENTS

JP S60-169184 A 9/1985
JP S63-137495 A 6/1988
(Continued)

OTHER PUBLICATIONS

International Preliminary Report on Patentability mailed Oct. 13, 2022 for PCT/JP2021/012673.

*Primary Examiner* — James A Menefee
(74) *Attorney, Agent, or Firm* — Faegre Drinker Biddle & Reath LLP

(57) ABSTRACT

A quantum-cascade laser element includes: a semiconductor substrate; a semiconductor mesa formed on the semiconductor substrate to include an active layer having a quantum-cascade structure and to extend along a light waveguide direction; an embedding layer formed to interpose the semiconductor mesa along a width direction of the semiconductor substrate; a cladding layer formed over the semiconductor mesa and over the embedding layer; and a metal layer formed on the cladding layer. A pair of groove portions (Continued)

extending along the light waveguide direction are formed in a surface on an opposite side of the cladding layer from the semiconductor substrate. The pair of groove portions are disposed in two respective outer regions when the cladding layer is equally divided into four regions in the width direction of the semiconductor substrate. The metal layer enters the pair of groove portions.

18 Claims, 10 Drawing Sheets

(51) Int. Cl.
*H01S 5/042* (2006.01)
*H01S 5/227* (2006.01)

(56) References Cited

U.S. PATENT DOCUMENTS

| | | | | |
|---|---|---|---|---|
| 5,889,913 | A * | 3/1999 | Tohyama | H01S 5/227 385/2 |
| 6,034,982 | A * | 3/2000 | Iwase | H01S 5/4031 372/38.1 |
| 7,061,022 | B1 * | 6/2006 | Pham | B82Y 20/00 257/713 |
| 2004/0086015 | A1 * | 5/2004 | Kawahara | H01S 5/227 372/45.01 |
| 2014/0348196 | A1 * | 11/2014 | Yoshinaga | H01S 5/023 372/45.01 |
| 2017/0324217 | A1 | 11/2017 | Carras et al. | |
| 2018/0241178 | A1 * | 8/2018 | Bachmann | B82Y 20/00 |
| 2019/0074664 | A1 * | 3/2019 | Ito | H01S 5/028 |
| 2022/0271509 | A1 * | 8/2022 | Kawahara | H01S 5/3211 |
| 2023/0148134 | A1 * | 5/2023 | Sugiyama | H01S 5/2202 372/45.012 |

FOREIGN PATENT DOCUMENTS

| | | | | |
|---|---|---|---|---|
| JP | H05-160506 | A | 6/1993 | |
| JP | H5136526 | | 6/1993 | |
| JP | H07-297497 | A | 11/1995 | |
| JP | H08-008483 | A | 1/1996 | |
| JP | H08-037335 | A | 2/1996 | |
| JP | H08-316589 | A | 11/1996 | |
| JP | H09-092926 | A | 4/1997 | |
| JP | 2746131 | B2 * | 4/1998 | H01S 3/18 |
| JP | 2000-216492 | A | 8/2000 | |
| JP | 2001-094210 | A | 4/2001 | |
| JP | 2001-298240 | A | 10/2001 | |
| JP | 2008135629 | A | 6/2008 | |
| JP | 2012-124361 | A | 6/2012 | |
| JP | 2012151291 | A | 8/2012 | |
| JP | 2013-033824 | A | 2/2013 | |
| JP | 2013-149665 | A | 8/2013 | |
| JP | 2013-165133 | A | 8/2013 | |
| JP | 2013-254908 | A | 12/2013 | |
| JP | 2014229744 | A | 12/2014 | |
| JP | 2016-076612 | A | 5/2016 | |
| JP | 2017-034080 | A | 2/2017 | |
| JP | 2017-050307 | A | 3/2017 | |
| JP | 2017-216418 | A | 12/2017 | |
| JP | 2018-098262 | A | 6/2018 | |
| JP | 2018152430 | A | 9/2018 | |
| JP | 2021-163924 | A | 10/2021 | |
| WO | WO-2015/081220 | A1 | 6/2015 | |

* cited by examiner (a)

(b)

(a)

(b)

(a)

(b)

QUANTUM CASCADE LASER ELEMENT AND QUANTUM CASCADE LASER DEVICE

TECHNICAL FIELD

One aspect of the present disclosure relates to a quantum-cascade laser element and a quantum-cascade laser device.

BACKGROUND ART

A quantum-cascade laser element is known that includes a semiconductor substrate; a semiconductor laminate formed on the semiconductor substrate to include a ridge portion; a current block layer formed over the ridge portion and over the semiconductor substrate; an insulating layer formed on the current block layer; and a metal layer formed on a top surface of the ridge portion and on the insulating layer (for example, refer to Patent Literature 1).

CITATION LIST

Patent Literature

Patent Literature 1: Japanese Unexamined Patent Publication No. 2018-98262

SUMMARY OF INVENTION

Technical Problem

In the above-described quantum-cascade laser element, an improvement in heat dissipation and an improvement in the stability of a laser element are required. Therefore, an object of one aspect of the present disclosure is to provide a quantum-cascade laser element and a quantum-cascade laser device capable of achieving an improvement in heat dissipation and an improvement in stability.

Solution to Problem

A quantum-cascade laser element according to one aspect of the present disclosure includes: a semiconductor substrate; a semiconductor mesa formed on the semiconductor substrate to include an active layer having a quantum-cascade structure and to extend along a light waveguide direction; an embedding layer formed to interpose the semiconductor mesa along a width direction of the semiconductor substrate; a cladding layer formed over the semiconductor mesa and over the embedding layer; and a metal layer formed on the cladding layer. A pair of groove portions extending along the light waveguide direction are formed in a surface of the cladding layer on a side opposite to the semiconductor substrate. The pair of groove portions are disposed in two outer regions respectively when the cladding layer is equally divided into four regions in the width direction of the semiconductor substrate. The metal layer enters the pair of groove portions.

The quantum-cascade laser element includes the embedding layer formed to interpose the semiconductor mesa along the width direction of the semiconductor substrate. Accordingly, heat generated in the active layer can be effectively dissipated. In addition, the pair of groove portions extending along the light waveguide direction are formed in the surface of the cladding layer on a side opposite to the semiconductor substrate. The pair of groove portions are disposed in the two outer regions respectively when the cladding layer is equally divided into the four regions in the width direction of the semiconductor substrate. The metal layer enters each of the groove portions. Since the metal layer enters each of the groove portions, bond strength between the metal layer and the cladding layer can be improved. As a result, the peeling or degradation of the metal layer can be suppressed, and the stability of the laser element can be improved. Particularly, since the metal layer enters each of the groove portions in the outer regions in which the peeling or the like of the metal layer is likely to occur, the peeling or the like of the metal layer can be effectively suppressed. In addition, since the pair of groove portions are disposed in the outer regions, a width of a portion between the pair of groove portions in the cladding layer can be widened. As a result, heat dissipation can be further improved. Therefore, according to the quantum-cascade laser element, an improvement in heat dissipation and an improvement in stability can be achieved.

The pair of groove portions may reach the embedding layer. In this case, the peeling or the like of the metal layer can be more effectively suppressed.

The quantum-cascade laser element according to one aspect of the present disclosure may further include a plating layer formed on the metal layer. A recessed portion may be formed in a surface of the plating layer on a side opposite to the semiconductor substrate. In this case, when the quantum-cascade laser element is joined to a support member by a joining material, the recessed portion can function as an escape portion of the joining material, and the joining material can be prevented from creeping up side surfaces of the quantum-cascade laser element.

A pair of the recessed portions may be provided, and the pair of recessed portions may overlap the pair of groove portions respectively when viewed in a thickness direction of the semiconductor substrate. Such recessed portions can be easily formed by forming the metal layer and the plating layer on the cladding layer including the groove portions.

The quantum-cascade laser element according to one aspect of the present disclosure may further include a dielectric layer disposed between the cladding layer and the metal layer. An opening that exposes the cladding layer from the dielectric layer in a region overlapping the semiconductor mesa when viewed in a thickness direction of the semiconductor substrate may be formed in the dielectric layer, and the metal layer may be in contact with the cladding layer through the opening. In this case, the bond strength between the metal layer and the cladding layer can be improved by the dielectric layer, and the peeling or the like of the metal layer can be further suppressed.

The dielectric layer may enter the pair of groove portions. In this case, the peeling or the like of the metal layer can be even further suppressed.

A width of the opening in the width direction of the semiconductor substrate may be more than or equal to two times a width of the semiconductor mesa. In this case, a region in which the metal layer is in contact with the cladding layer can be widened, and heat dissipation can be even further improved.

A width of the opening in the width direction of the semiconductor substrate may be more than or equal to ten times a thickness of the cladding layer. In this case, the region in which the metal layer is in contact with the cladding layer can be widened, and heat dissipation can be even further improved.

The quantum-cascade laser element according to one aspect of the present disclosure may further include a wire made of metal, that is electrically connected to the metal layer. A connection position between the metal layer and the wire may overlap the dielectric layer when viewed in the thickness direction of the semiconductor substrate. In this case, the occurrence of the peeling or the like of the metal layer caused by a tensile stress that the wire acts on the metal layer can be suppressed.

A thickness of the cladding layer may be thinner in a second region located outside a first region in the width direction of the semiconductor substrate than in the first region of which at least a part overlaps the semiconductor mesa when viewed in a thickness direction of the semiconductor substrate, and the metal layer may extend over the first region and the second region. In the quantum-cascade laser element, in order to stably output light of a basic mode having a peak of intensity at a central portion of the ridge portion in the width direction, suppressing the oscillation of light of a high-order mode having a peak of intensity on both sides of the central portion is required. When the embedding layer that interposes the semiconductor mesa along the width direction is provided, since heat dissipation can be improved but a light confinement effect of the embedding layer is weak, the light of the high-order mode is likely to be oscillated. In this regard, in the quantum-cascade laser element, the thickness of the cladding layer is thinner in the second regions located outside the first region in the width direction of the semiconductor substrate than in the first region of which at least a part overlaps the semiconductor mesa when viewed in the thickness direction of the semiconductor substrate, and the metal layer extends over the first region and the second region. Accordingly, the light of the high-order mode can be absorbed by the metal layer formed to reach the second region, and the oscillation of the high-order mode can be suppressed.

A width of the cladding layer in the first region may be more than or equal to a width of the semiconductor mesa. In this case, the oscillation of the high-order mode can be suppressed while suppressing a loss in the basic mode.

A width of the cladding layer in the first region may be less than or equal to four times a width of the semiconductor mesa. In this case, the oscillation of the high-order mode can be effectively suppressed.

The thickness of the cladding layer in the second region may be less than or equal to half the thickness of the cladding layer in the first region. In this case, the oscillation of the high-order mode can be even more effectively suppressed.

The surface of the cladding layer on a side opposite to the semiconductor substrate may include an inclined surface formed at a boundary portion between the first region and the second region, and when viewed in the light waveguide direction, the inclined surface may be inclined to go outward as approaching the semiconductor substrate. When viewed in the light waveguide direction, the inclined surface may be curved to protrude toward the active layer. In these cases, the uniformity of the metal layer formed on the inclined surface can be improved, and the occurrence of a variation in a characteristic of suppressing the oscillation of the high-order mode can be suppressed.

A thickness of the cladding layer may be uniform except for a portion at which the pair of groove portions are formed. In this case, heat dissipation can be even further improved.

A quantum-cascade laser device according to one aspect of the present disclosure includes: the quantum-cascade laser element; and a drive unit that drives the quantum-cascade laser element. In the quantum-cascade laser device, an improvement in heat dissipation and an improvement in stability can be achieved.

The quantum-cascade laser device according to one aspect of the present disclosure may further include a support member including an electrode pad and supporting the quantum-cascade laser element; and a joining material that joins the support member and the quantum-cascade laser element. The quantum-cascade laser element may include a plating layer formed on the metal layer. A recessed portion may be formed in a surface of the plating layer on a side opposite to the semiconductor substrate. The joining material may join the electrode pad and the plating layer in a state where the semiconductor mesa is located on a side of the support member with respect to the semiconductor substrate and the joining material enters into the recessed portion. In this case, since the recessed portion function as an escape portion of the joining material, the joining material is prevented from creeping up the side surfaces of the quantum-cascade laser element.

The drive unit may drive the quantum-cascade laser element to continuously oscillate laser light. In this case, a lot of heat is generated in the active layer. In this regard, in the quantum-cascade laser device, since heat dissipation is improved as described above, heat generated in the active layer can be well dissipated.

Advantageous Effects of Invention

According to the present disclosure, it is possible to provide the quantum-cascade laser element and the quantum-cascade laser device capable of achieving an improvement in heat dissipation and an improvement in stability.

DESCRIPTION OF EMBODIMENTS

Hereinafter, one embodiment of the present disclosure will be described in detail with reference to the drawings. In the following description, the same reference signs are used for the same or equivalent elements, and duplicated descriptions will be omitted.

[Configuration of Quantum-Cascade Laser Element]

Figure 1:
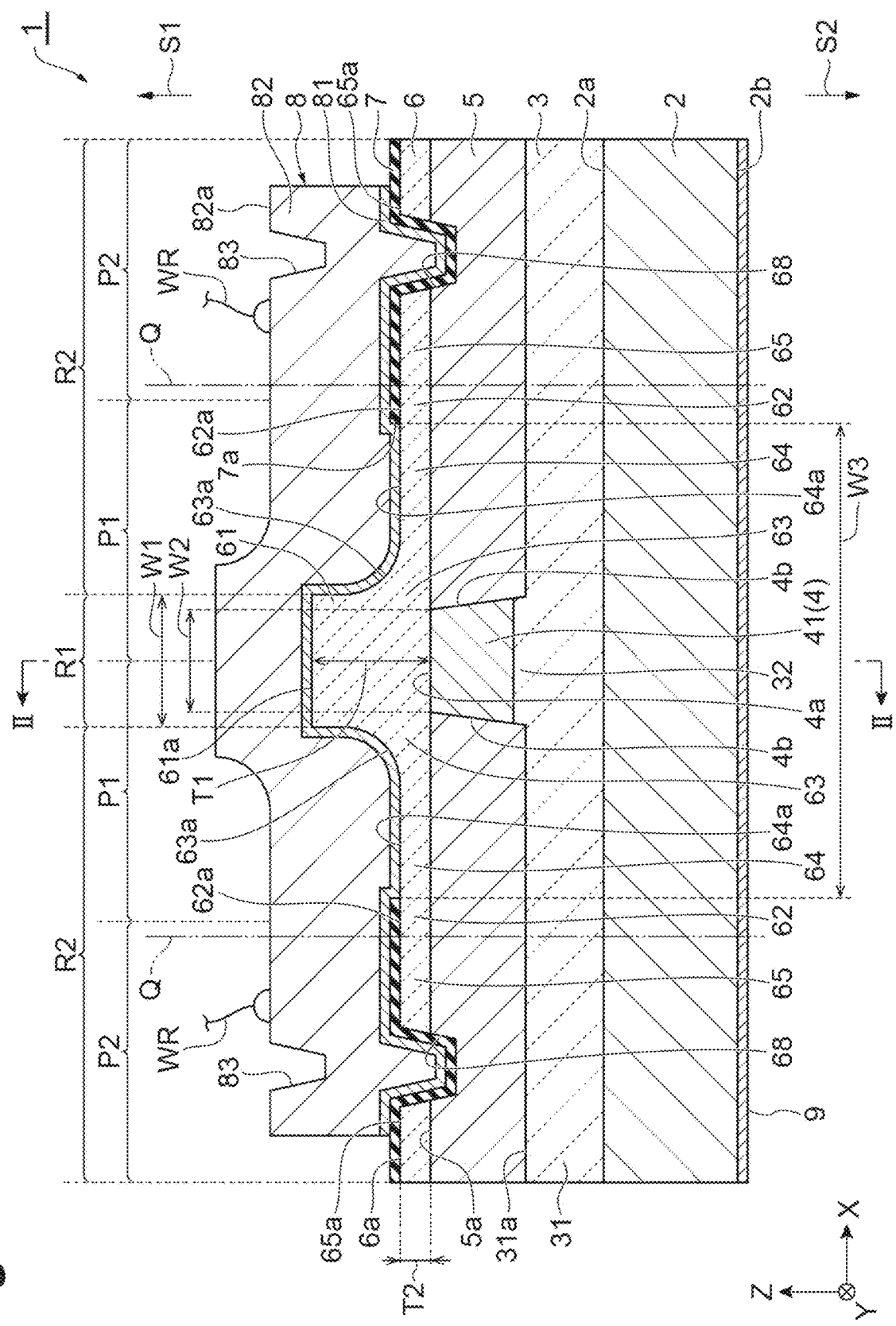
FIG. 1 is a cross-sectional view of a quantum-cascade laser element according to one embodiment.
Figure 2:
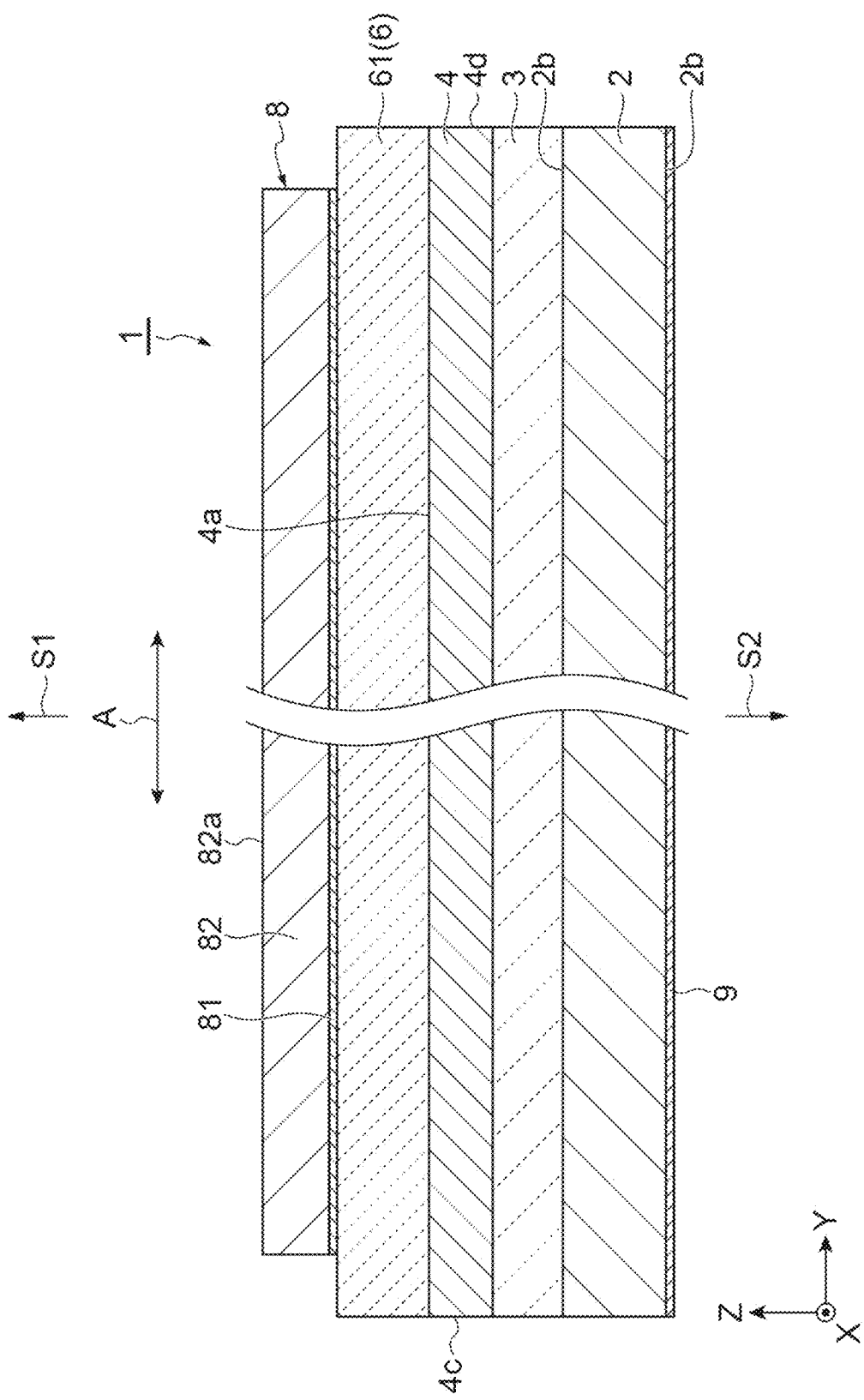
FIG. 2 is a cross-sectional view taken along line II-II of FIG. 1.

As shown in FIGS. 1 and 2, a quantum-cascade laser element 1 includes a semiconductor substrate 2, a lower cladding layer 3, a semiconductor mesa 4, an embedding layer 5, an upper cladding layer 6, a dielectric layer 7, a first electrode 8, and a second electrode 9. The semiconductor substrate 2 is, for example, an S-doped InP single crystal substrate having a rectangular plate shape. As one example, a length of the semiconductor substrate 2 is approximately 2 mm, a width of the semiconductor substrate 2 is approximately 500 μm, and a thickness of the semiconductor substrate 2 is approximately one hundred and several tens of μm.

In the following description, a width direction of the semiconductor substrate 2 is referred to as an X-axis direction, a length direction of the semiconductor substrate 2 is referred to as a Y-axis direction, and a thickness direction of the semiconductor substrate 2 is referred to as a Z-axis direction. A side on which the semiconductor mesa 4 is located with respect to the semiconductor substrate 2 in the Z-axis direction is referred to as a first side S1, and a side on which the semiconductor substrate 2 is located with respect to the semiconductor mesa 4 in the Z-axis direction is referred to as a second side S2. The quantum-cascade laser element 1 is configured to be in line symmetry with respect to a center line passing through the center of the quantum-cascade laser element 1 and being parallel to the Z-axis direction when viewed in the Y-axis direction.

The lower cladding layer 3 is formed on a surface 2a on the first side S1 of the semiconductor substrate 2. The lower cladding layer 3 includes a body portion 31 and a protrusion portion 32 protruding from the body portion 31 to the first side S1. The semiconductor mesa 4 includes an active layer 41 having a quantum-cascade structure and extends along the Y-axis direction. The semiconductor mesa 4 is formed on the surface 2a of the semiconductor substrate 2 with the lower cladding layer 3 interposed therebetween. In this example, the semiconductor mesa 4 is provided on the protrusion portion 32 of the lower cladding layer 3.

The semiconductor mesa 4 has a top surface 4a and a pair of side surfaces 4b. The top surface 4a is a surface on the first side S1 of the semiconductor mesa 4. The pair of side surfaces 4b are surfaces on both sides of the semiconductor mesa 4 in the X-axis direction. In this example, each of the top surface 4a and the side surfaces 4b is a flat surface. When viewed in the Y-axis direction, the pair of side surfaces 4b are inclined to approach each other as going away from the semiconductor substrate 2 (toward the first side S1).

The embedding layer 5 is formed on a surface 31a on the first side S1 of the body portion 31 of the lower cladding layer 3 and interposes the protrusion portion 32 of the lower cladding layer 3 and the semiconductor mesa 4 in the X-axis direction. Namely, the embedding layer 5 is provided on both sides of the protrusion portion 32 and the semiconductor mesa 4 in the X-axis direction and embeds the protrusion portion 32 and the semiconductor mesa 4. The embedding layer 5 is in contact with each of side surfaces of the protrusion portion 32 and with each of the side surfaces 4b of the semiconductor mesa 4. A surface 5a on the first side S1 of the embedding layer 5 is located on the same plane as (flush with) the top surface 4a of the semiconductor mesa 4. A thickness of the embedding layer 5 is, for example, approximately 2 μm.

The upper cladding layer 6 is formed over the top surface 4a of the semiconductor mesa 4 and over the surface 5a of the embedding layer 5. Although not shown, a lower guide layer is disposed between the lower cladding layer 3 and the active layer 41, and an upper guide layer is disposed between the upper cladding layer 6 and the active layer 41. The upper guide layer has a diffraction grating structure functioning as a distributed feedback (DFB) structure.

The semiconductor mesa 4 is formed of the lower guide layer, the active layer 41, and the upper guide layer. A width of the semiconductor mesa 4 in the X-axis direction is narrower than a width of the semiconductor substrate 2 in the X-axis direction. A length of the semiconductor mesa 4 in the Y-axis direction is equal to a length of the semiconductor substrate 2 in the Y-axis direction. As one example, the length of the semiconductor mesa 4 is approximately 2 mm, the width of the semiconductor mesa 4 is approximately 5 to 6 μm, and a thickness of the semiconductor mesa 4 is approximately 2 μm. The semiconductor mesa 4 is located at the center of the semiconductor substrate 2 in the X-axis direction.

The active layer 41 has, for example, a multiple quantum well structure of InGaAs/InAlAs. The active layer 41 is configured to oscillate laser light having a predetermined center wavelength. The center wavelength is, for example, any value of 4 μm to 11 μm and may be any value of 4 μm to 6 μm. Each of the lower cladding layer 3 and the upper cladding layer 6 is, for example, a Si-doped InP layer. Each of the lower guide layer and the upper guide layer is, for example, a Si-doped InGaAs layer. The embedding layer 5 is a semiconductor layer formed of, for example, a Fe-doped InP layer.

The semiconductor mesa 4 has a first end surface 4c and a second end surface 4d that are both end surfaces in a light waveguide direction A (FIG. 2). The light waveguide direction A is a direction parallel to the Y-axis direction that is an extending direction of the semiconductor mesa 4. The first end surface 4c and the second end surface 4d function as light-emitting end surfaces. The first end surface 4c and the second end surface 4d are located on the same planes as both respective end surfaces of the semiconductor substrate 2 in the Y-axis direction.

The upper cladding layer 6 includes a first portion 61 located in a first region (inner region) R1, and a pair of second portions 62 located in second regions (outer regions) R2. When viewed in the Z-axis direction, a part on a center side of the first region R1 overlaps the semiconductor mesa 4. Each of the second regions R2 is located outside the first region R1 in the X-axis direction (on an outer edge side of the semiconductor substrate 2). Each of the second regions R2 is continuous with the first region R1. The first portion 61 is the upper cladding layer 6 in the first region R1, and the second portions 62 are the upper cladding layer 6 in the second regions R2. The first portion 61 and the second portions 62 are integrally formed. The second portions 62 (upper cladding layer 6) reach end surfaces of the quantum-cascade laser element 1 in the X-axis direction.

A thickness T2 of the second portions 62 is thinner than a thickness T1 of the first portion 61. Namely, a thickness of the upper cladding layer 6 is thinner in the second regions R2 than in the first region R1. In this example, the thickness T2 is less than or equal to half the thickness T1. The first portion 61 is a thick portion thicker than the second portions 62, and the second portions 62 are thin portions thinner than the first portion 61. The thickness T1 of the first portion 61 is a maximum thickness of the first portion 61 in the Z-axis direction, and the thickness T2 of the second portions 62 is a maximum thickness of the second portions 62 in the Z-axis direction. As in this example, when a connection portion 63 that changes in thickness is formed, the thickness T1 of the first portion 61 is a maximum thickness of a portion other than the connection portion 63, and the thickness T2 of the second portions 62 is a maximum thickness of a portion other than the connection portion 63. As one example, the thickness T1 of the first portions 61 is approximately 1 to 3.5 µm, and the thickness T2 of the second portions 62 is 1.0 µm or less.

Each of the second portions 62 includes the connection portion 63 formed at a boundary portion between each of the second portions 62 and the first portion 61. A thickness of the connection portion 63 in the Z-axis direction increases toward the first portion 61. Accordingly, a surface on the first side S1 of the connection portion 63 is an inclined surface 63a. When viewed in the Y-axis direction, the inclined surface 63a is inclined to go outward as approaching the semiconductor substrate 2 (going toward the second side S2). In addition, when viewed in the Y-axis direction, the inclined surface 63a is curved to protrude toward the active layer 41.

A width W1 of the first portion 61 is more than or equal to a width W2 of the semiconductor mesa 4 and less than or equal to four times the width W2 of the semiconductor mesa 4. The width W1 of the first portion 61 is a width of the first portion 61 in the X-axis direction and is a width of an end portion on the first side S1 of the first portion 61 (top surface 61a of the first portion 61). The width W2 of the semiconductor mesa 4 is a width of the semiconductor mesa 4 in the X-axis direction and is a width of an end portion on the first side S1 of the semiconductor mesa 4 (top surface 4a of the semiconductor mesa 4) As one example, the width W1 of the first portion 61 is approximately 12 µm, and the width W2 of the semiconductor mesa 4 is approximately 5 µm.

A pair of groove portions (trenches) 68 extending along the Y-axis direction are formed in a surface 6a on the first side S1 of the upper cladding layer 6. More specifically, the groove portions 68 each are formed in the second portions 62 of the upper cladding layer 6. The pair of groove portions 68 are disposed in two outer regions P2 respectively when the upper cladding layer 6 is equally divided into four regions P1 and P2 in the X-axis direction. In this example, two regions P1 are inner regions and the two regions P2 are outer regions. A width of the regions P1 in the X-axis direction is equal to a width of the regions P2 in the X-axis direction. The pair of groove portions 68 are formed outside straight lines Q each passing through a center point of a region between the side surfaces 4b of the semiconductor mesa 4 and an outer edge of the quantum-cascade laser element 1 (outer edge of the semiconductor substrate 2) in the X-axis direction and being parallel to the Z-axis direction when viewed in the Y-axis direction, respectively.

The groove portions 68 each reach the embedding layer 5 from surfaces 62a on the first side S1 of the second portions 62 in the Z-axis direction. Namely, each of the groove portions 68 penetrates through the upper cladding layer 6. The groove portions 68 each extend linearly in the Y-axis direction to reach both outer edges of the upper cladding layer 6. A width of the groove portions 68 in the X-axis direction narrow toward bottom portions of the groove portions 68. A maximum width of each of the groove portions 68 in the X-axis direction (width of an end portion on the first side S1) is, for example, approximately 10 µm to 20 µm. In this example, the upper cladding layer 6 is separated into a plurality of portions by the groove portions 68, but the upper cladding layer 6 includes the plurality of portions. The plurality of portions are made of the same material with substantially the same thickness.

The dielectric layer 7 is, for example, a dielectric layer (insulating layer) formed of a SiN film or a $SiO_2$ film. The dielectric layer 7 is formed on surfaces 65a of outer portions 65 of the second portions 62 such that a part of the surface 6a of the upper cladding layer 6 (top surface 61a of the first portion 61 and surfaces 64a of inner portions 64 of the second portions 62) is exposed from the dielectric layer 7. The inner portions 64 each are portions of the second portions 62 that are continuous with the first portion 61, and include the connection portions 63. The outer portions 65 each are portions of the second portions 62 located outside the inner portions 64 in the X-axis direction. The surfaces 64a are surfaces on the first side S1 of the inner portions 64, and the surfaces 65a are surfaces on the first side S1 of the outer portions 65. Each of the surfaces 64a of the inner portions 64 includes the inclined surface 63a of the connection portion 63.

The dielectric layer 7 is formed on the surfaces 65a of the outer portions 65 and is not formed on the surfaces 64a of the inner portions 64 to expose the surfaces 64a. In other words, an opening 7a that exposes the first portion 61 and the inner portions 64 of the second portions 62 from the dielectric layer 7 is formed in the dielectric layer 7. The opening 7a exposes the top surface 61a of the first portion 61 and the surfaces 64a of the inner portions 64 of the second portion 62 from the dielectric layer 7. An outer edge of the dielectric layer 7 reaches an outer edge of the upper cladding layer 6 (outer edge of the semiconductor substrate 2) in both the X-axis direction and the Y-axis direction. The dielectric layer 7 also functions as an adhesion layer that enhances adhesion between the upper cladding layer 6 and a metal layer 81 to be described later.

A width W3 of the opening 7a in the X-axis direction is more than or equal to two times the width W2 of the semiconductor mesa 4 in the X-axis direction. The width W3 may be more than or equal to five times the width W2. As one example, the width W3 is approximately 50 µm and the width W2 is approximately 5 µm. In addition, the width W3 of the opening 7a is more than or equal to ten times the thickness of the upper cladding layer 6. The thickness of the upper cladding layer 6 is a maximum thickness of the upper cladding layer 6 in the Z-axis direction and in this example, is the thickness T1 of the first portion 61 of the upper cladding layer 6. As described above, the thickness T1 of the first portion 61 is, for example, approximately 3.5 µm.

The dielectric layer 7 enters each of the pair of groove portions 68. The dielectric layer 7 extends inside the groove portions 68 along inner surfaces of the groove portions 68 and adheres to the inner surfaces of the groove portions 68.

The first electrode 8 includes the metal layer 81 and a plating layer 82. The metal layer 81 is, for example, a Ti/Au layer and functions as a foundation layer (seed layer) for forming the plating layer 82. The plating layer 82 is formed on the metal layer 81. The plating layer 82 is, for example, an Au plating layer. A thickness of the first electrode 8 in the Z-axis direction is, for example, 8 µm or more.

The metal layer 81 is integrally formed to extend over the surface 6a of the upper cladding layer 6. More specifically, the metal layer 81 is formed over the top surface 61a and side surfaces of the first portion 61 and over the surfaces 62a of the second portions 62 including the inclined surfaces 63a of the connection portions 63. Namely, the metal layer 81 extends over the first region R1 and over the second regions R2. The metal layer 81 enters each of the pair of groove portions 68. The metal layer 81 extends inside the groove portions 68 along the inner surfaces of the groove portions 68 and is bonded to the inner surfaces of the groove portions 68 via the dielectric layer 7.

The metal layer 81 is in contact with the top surface 61a and the side surfaces of the first portion 61 and with the surfaces 64a of the inner portions 64 of the second portions 62 including the inclined surfaces 63a of the connection portions 63, through the opening 7a of the dielectric layer 7. The metal layer 81 is formed on the second portions 62 at the outer portions 65 of the second portions 62 via the dielectric layer 7. Namely, the dielectric layer 7 is disposed between the outer portions 65 of the second portions 62 and the first electrode 8.

A contact layer (not shown) is disposed between the metal layer 81 and the top surface 61a of the first portion 61 of the upper cladding layer 6. The contact layer is, for example, a Si-doped InGaAs layer. The metal layer 81 is in contact with the top surface 61a of the first portion 61 via the contact layer. Accordingly, the first electrode 8 is electrically connected to the upper cladding layer 6 via the contact layer. An outer edge of the metal layer 81 is located inside the outer edge of the dielectric layer 7 (outer edge of the semiconductor substrate 2) in both the X-axis direction and the Y-axis direction. A distance between the outer edge of the metal layer 81 and the outer edge of the dielectric layer 7 (outer edge of the semiconductor substrate 2) in the X-axis direction is, for example, approximately 50 μm.

The plating layer 82 enters each of the pair of groove portions 68. Accordingly, a pair of recessed portions (groove portions) 83 are formed in a surface 82a on the first side S1 of the plating layer 82. The pair of recessed portions 83 overlap the pair of respective groove portions 68 when viewed in the Z-axis direction. The recessed portions 83 each extend linearly in the Y-axis direction to reach both outer edges of the plating layer 82. A shape of the recessed portions 83 in a cross section perpendicular to the Y-axis direction is a shape corresponding to the groove portions 68 (shape similar to that of the groove portions 68).

A plurality of wires WR made of metal are electrically connected to the surface 82a of the plating layer 82. Each of the wires WR is formed, for example, by wire bonding and is electrically connected to the metal layer 81 via the plating layer 82. A connection position between the metal layer 81 (plating layer 82) and each of the wires WR overlaps the dielectric layer 7 when viewed in the Z-axis direction. The connection position is located inside the recessed portions 83 in the X-axis direction. Incidentally, the number of the wires WR is not limited and only one wire WR may be provided.

The second electrode 9 is formed on a surface 2b on the second side S2 of the semiconductor substrate 2. The second electrode 9 is, for example, an AuGe/Au film, an AuGe/Ni/Au film, or an Au film. The second electrode 9 is electrically connected to the lower cladding layer 3 via the semiconductor substrate 2.

In the quantum-cascade laser element 1, when a bias voltage is applied to the active layer 41 through the first electrode 8 and through the second electrode 9, light is emitted from the active layer 41, and light having a predetermined center wavelength of the light is resonated in the distributed feedback structure. Accordingly, the laser light having the predetermined center wavelength is emitted from each of the first end surface 4c and the second end surface 4d. A high reflection film may be formed on one of the first end surface 4c and the second end surface 4d. In this case, the laser light having the predetermined center wavelength is emitted from the other of the first end surface 4c and the second end surface 4d. Alternatively, a low reflection film may be formed on one end surface of the first end surface 4c and the second end surface 4d. In addition, a high reflection film may be formed on the other end surface different from the end surface on which the low reflection film is formed. In both cases, the laser light having the predetermined center wavelength is emitted from one end surface of the first end surface 4c and the second end surface 4d. In the former case, the laser light is emitted from both the first end surface 4c and the second end surface 4d.

[Method for Manufacturing Quantum-Cascade Laser Element]

Figure 3:
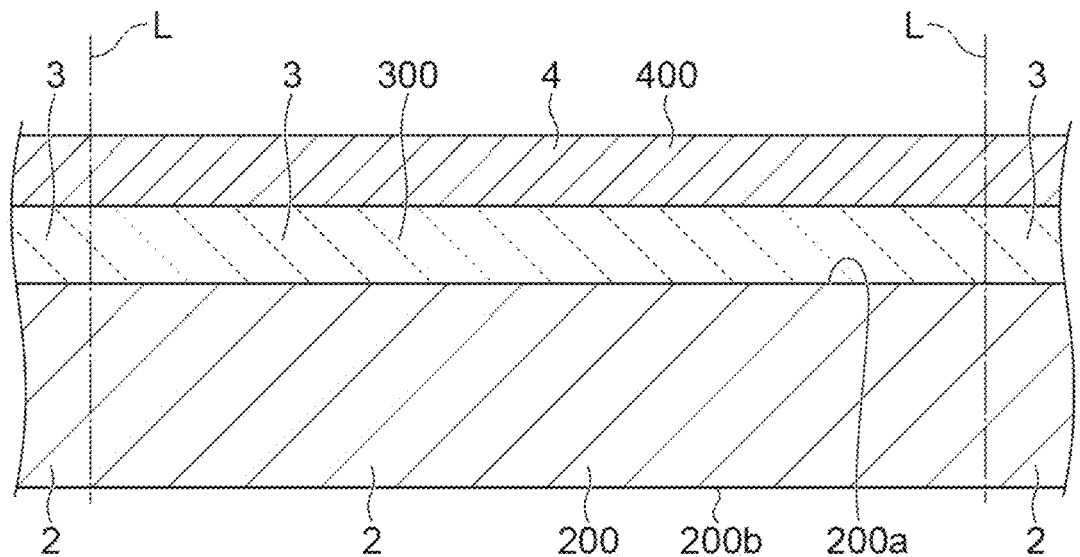
FIGS. 3(a) and 3(b) are views showing a method for manufacturing a quantum-cascade laser element.
Figure 3:
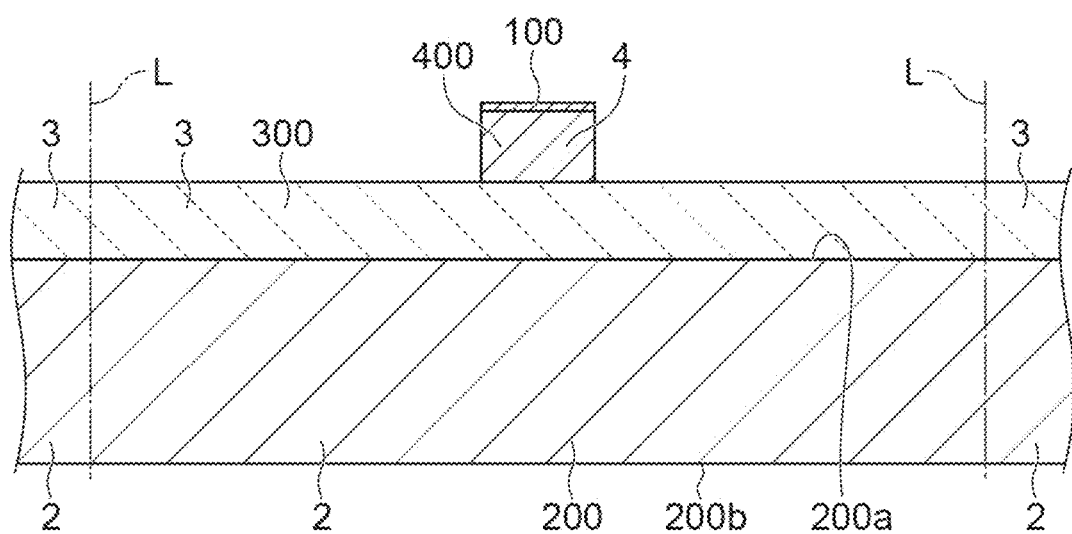
Figure 4:
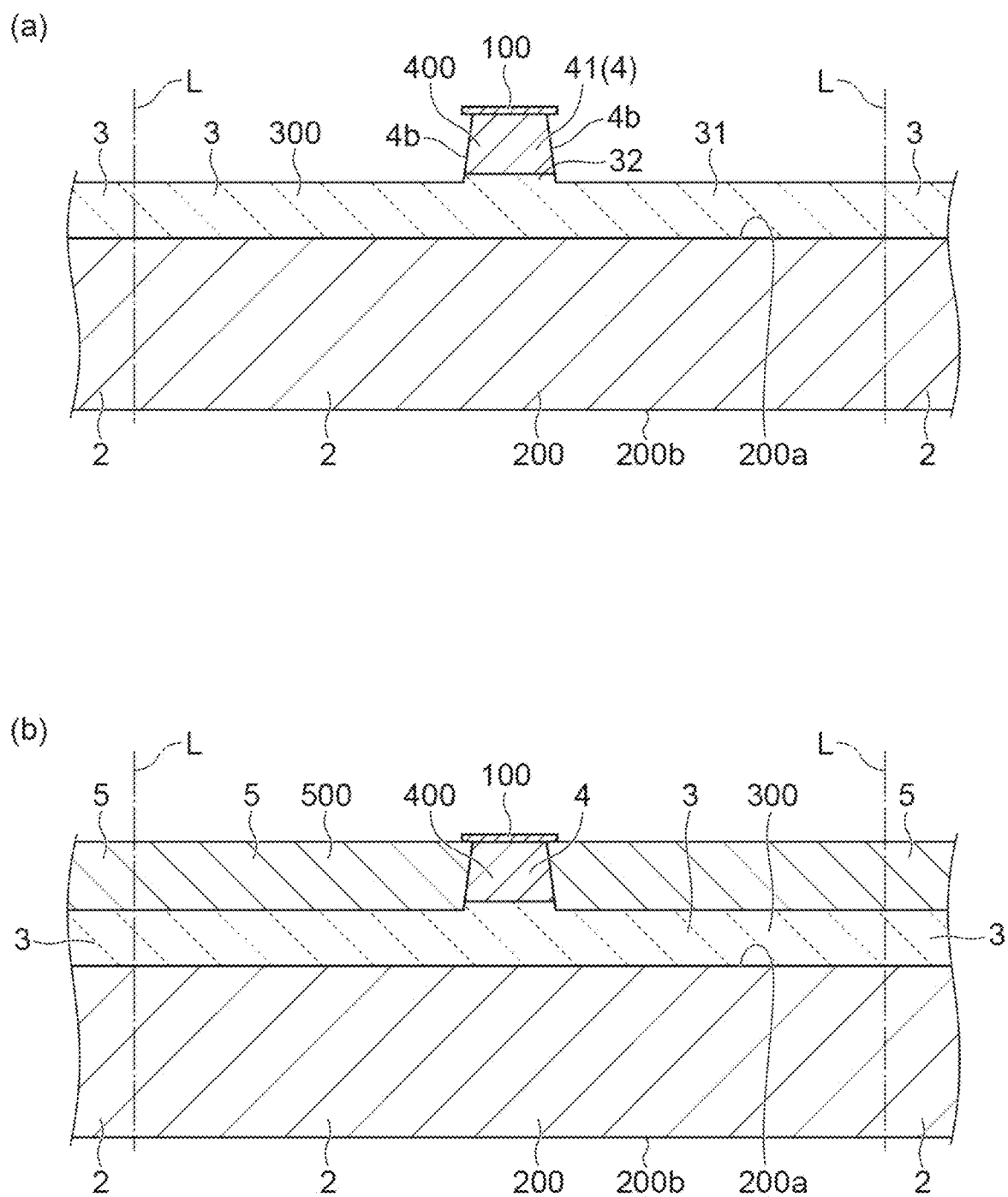
FIGS. 4(a) and 4(b) are views showing the method for manufacturing a quantum-cascade laser element.

A method for manufacturing the quantum-cascade laser element 1 will be described with reference to FIGS. 3 to 6. First, as shown in FIG. 3(a), a semiconductor wafer 200 having a first major surface 200a and a second major surface 200b is prepared, and a semiconductor layer 300 and a semiconductor layer 400 are formed on the first major surface 200a of the semiconductor wafer 200. The semiconductor wafer 200 is, for example, an S-doped InP single crystal (100) wafer. The semiconductor wafer 200 includes a plurality of portions, each of which becomes the semiconductor substrate 2, and is cleaved along a line L in a post-process to be described later. Similarly, the semiconductor layer 300 includes a plurality of portions, each of which becomes the lower cladding layer 3, and the semiconductor layer 400 includes a plurality of portions, each of which becomes the semiconductor mesa 4. The semiconductor layers 300 and 400 are formed, for example, by epitaxially growing each layer (namely, a layer becoming each of the lower cladding layer 3, the lower guide layer, the active layer 41, and the upper guide layer) using MO-CVD.

Subsequently, a diffraction grating pattern is formed on a portion of the semiconductor layer 400, the portion becoming the semiconductor mesa 4 (portion becoming the upper guide layer). Specifically, for example, the diffraction grating pattern is formed on the semiconductor layer 400 by forming a dielectric film having a shape corresponding to the diffraction grating pattern on the semiconductor layer 400 and by dry-etching the semiconductor layer 400 using the dielectric film as a mask. The dielectric film is formed of, for example, a SiN film or a SiO$_2$ film. The dielectric film is removed by etching.

Subsequently, as shown in FIG. 3(b), a dielectric film 100 is formed on a portion of the semiconductor layer 400, the portion becoming the semiconductor mesa 4, and the semiconductor layer 400 is dry-etched up to the semiconductor layer 300 using the dielectric film 100 as a mask. The dielectric film 100 is formed of, for example, a SiN film or a SiO$_2$ film. The dielectric film 100 is patterned into a shape shown in FIG. 3(b) by, for example, the photolithography and etching. A width of the dielectric film 100 in the X-axis direction is, for example, approximately 6 μm.

Subsequently, as shown in FIG. 4(a), the semiconductor layer 400 is wet-etched using the dielectric film 100 as a mask. Accordingly, the semiconductor mesa 4 is formed in the semiconductor layer 400.

Subsequently, as shown in FIG. 4(b), an embedding layer 500 is formed on the semiconductor layer 400. The embedding layer 500 includes a plurality of portions, each of which becomes the embedding layer 5. The embedding layer 500 is formed, for example, by crystal growth using MO-CVD. Since the dielectric film 100 functions as a mask, the embedding layer 500 is not formed on the dielectric film 100.

Subsequently, as shown in FIG. 5(a), the dielectric film 100 is removed by etching, and a semiconductor layer 600 is formed on the embedding layer 500. The semiconductor layer 600 includes a plurality of portions, each of which becomes the upper cladding layer 6. The semiconductor layer 600 is formed, for example, by crystal growth using MO-CVD. In addition, at this time, a semiconductor layer (not shown) including a plurality of portions, each of which becomes the contact layer, is formed on the semiconductor layer 600 by crystal growth using MO-CVD.

Figure 5:
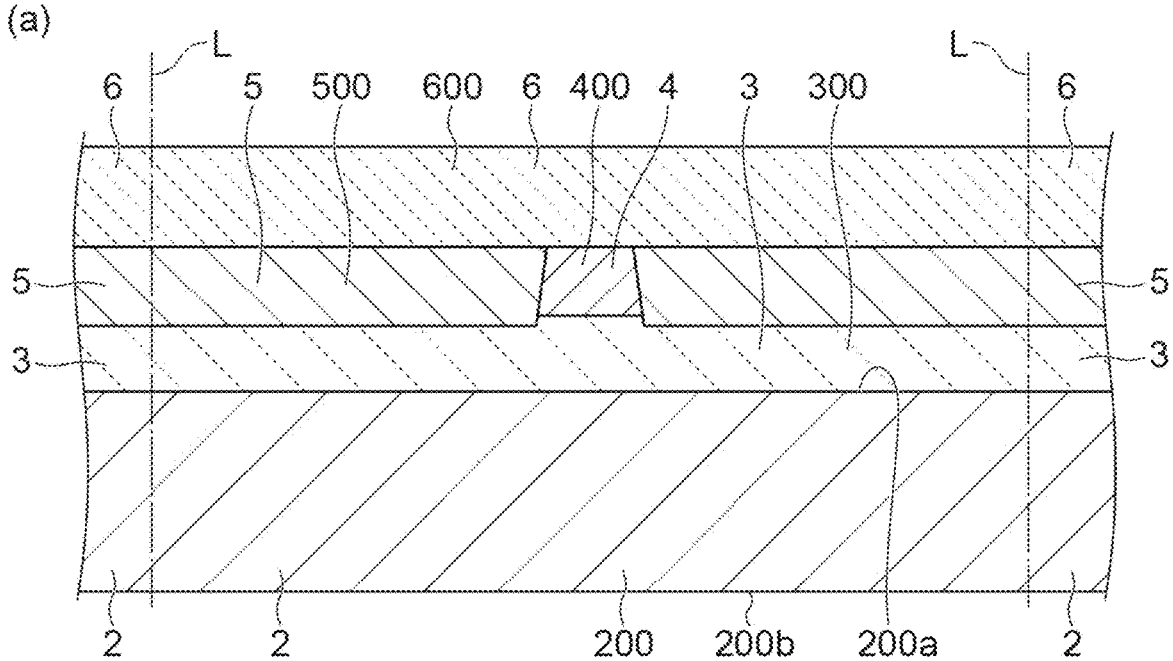
FIGS. 5(a) and 5(b) are views showing the method for manufacturing a quantum-cascade laser element.
Figure 5:
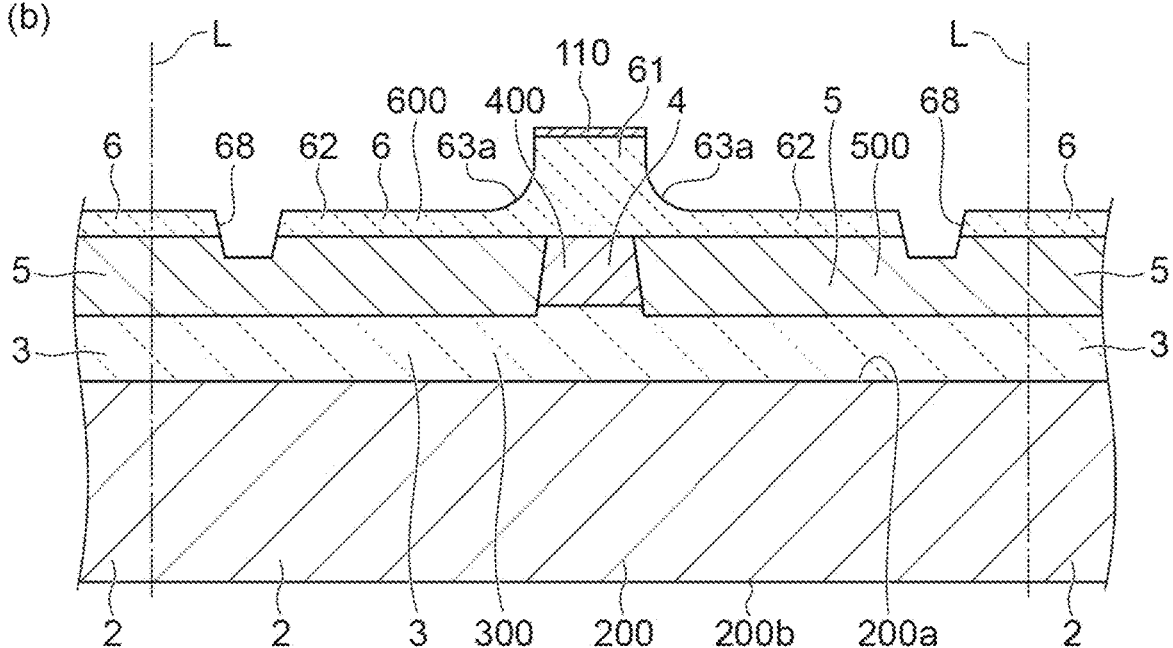

Subsequently, as shown in FIG. 5(*b*), a dielectric film 110 is formed on a portion of the semiconductor layer 600, the portion to be the first portion 61 of the upper cladding layer 6, and the semiconductor layer 600 is etched using the dielectric film 110 as a mask. Accordingly, the upper cladding layer 6 including the first portion 61 and the second portions 62 are formed in the semiconductor layer 600. The dielectric film 110 is formed of, for example, a SiN film or a SiO$_2$ film. The dielectric film 110 is patterned into a shape shown in FIG. 5(*b*) by, for example, photolithography and etching. The dielectric film 110 is removed by etching. Subsequently, the pair of groove portions 68 are formed in the semiconductor layer 600 and in the embedding layer 500. Specifically, for example, the pair of groove portions 68 are formed by forming a dielectric film on the upper cladding layer 6 and by etching the semiconductor layer 600 and the embedding layer 500 using the dielectric film as a mask. The dielectric film is removed by etching.

Figure 6:
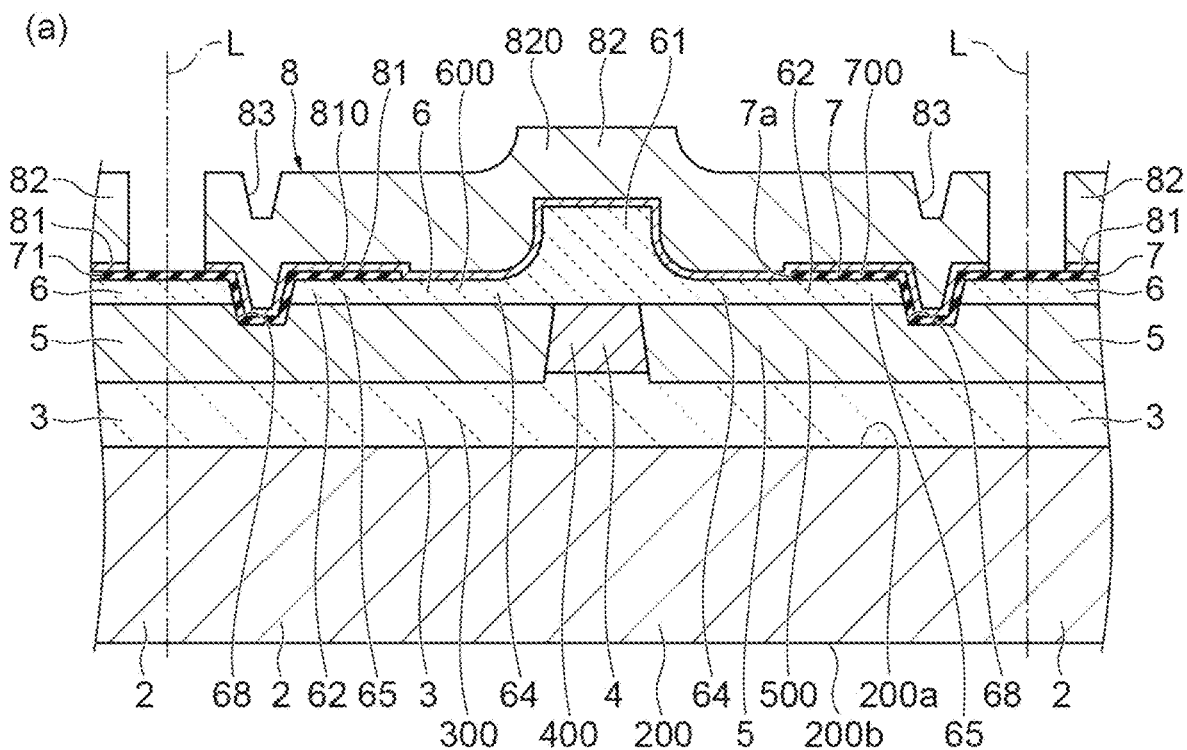
FIGS. 6(a) and 6(b) are views showing the method for manufacturing a quantum-cascade laser element.
Figure 6:
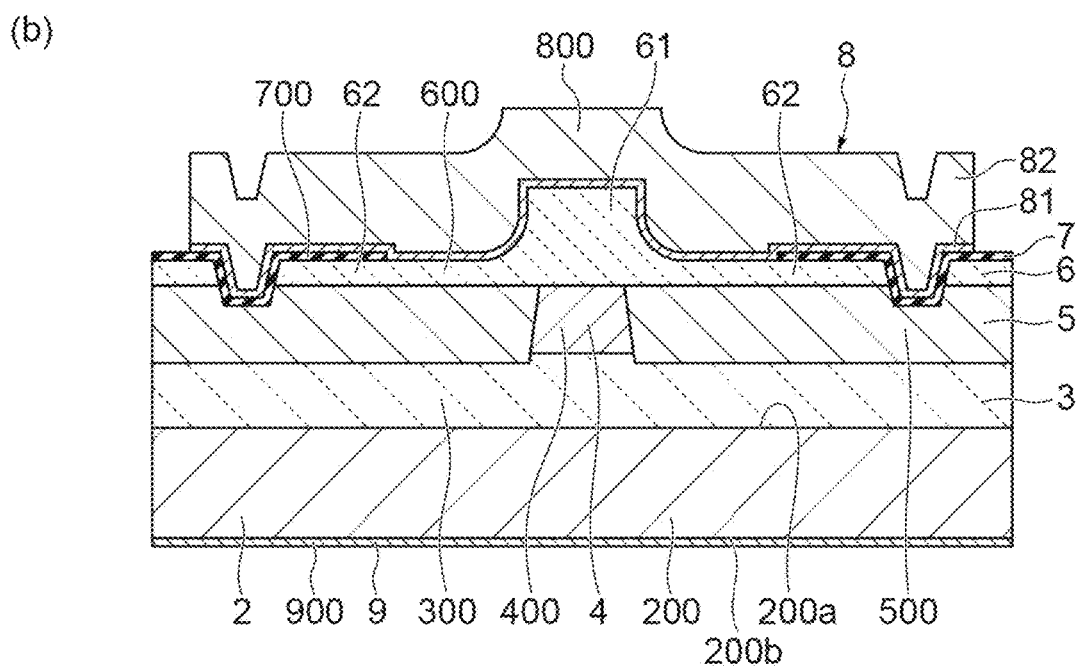

Subsequently, as shown in FIG. 6(*a*), a dielectric layer 700 is formed on the semiconductor layer 600. The dielectric layer 700 includes a plurality of portions, each of which becomes the dielectric layer 7. The dielectric layer 700 is patterned into a shape shown in FIG. 6(*a*) by, for example, photolithography and etching. Accordingly, the opening 7*a* (contact hole) is formed in the dielectric layer 700.

Subsequently, as shown in FIG. 6(*a*), a metal layer 810 is formed over the first portion 61 and the second portions 62 of the upper cladding layer 6, and then a plating layer 820 is formed on the metal layer 810. The metal layer 810 includes a plurality of portions, each of which becomes the metal layer 81, and the plating layer 820 includes a plurality of portions, each of which becomes the plating layer 82. The metal layer 810 is an ohmic electrode formed, for example, by sputtering or evaporating Ti having a thickness of approximately 50 nm and Au having a thickness of approximately 100 nm in order. A thickness of the plating layer 820 is, for example, approximately 5 μm to 8 μm. The metal layer 810 on the line L is removed, for example, by etching after the plating layer 820 is formed. The line L is a planned cleavage line that partitions between a plurality of portions that become the quantum-cascade laser elements 1.

Subsequently, as shown in FIG. 6(*b*), the semiconductor wafer 200 is thinned by polishing the second major surface 200*b* of the semiconductor wafer 200. Subsequently, an electrode layer 900 is formed on the second major surface 200*b* of the semiconductor wafer 200. The electrode layer 900 includes a plurality of portions, each of which becomes the second electrode 9. The electrode layer 900 may be subjected to an alloy heat treatment. Subsequently, the semiconductor wafer 200, the semiconductor layer 300, the embedding layer 500, the semiconductor layer 600, and the dielectric layer 700 are cleaved along the line L. Accordingly, a plurality of the quantum-cascade laser elements 1 are obtained.

[Configuration of Quantum-Cascade Laser Device]

Figure 7:
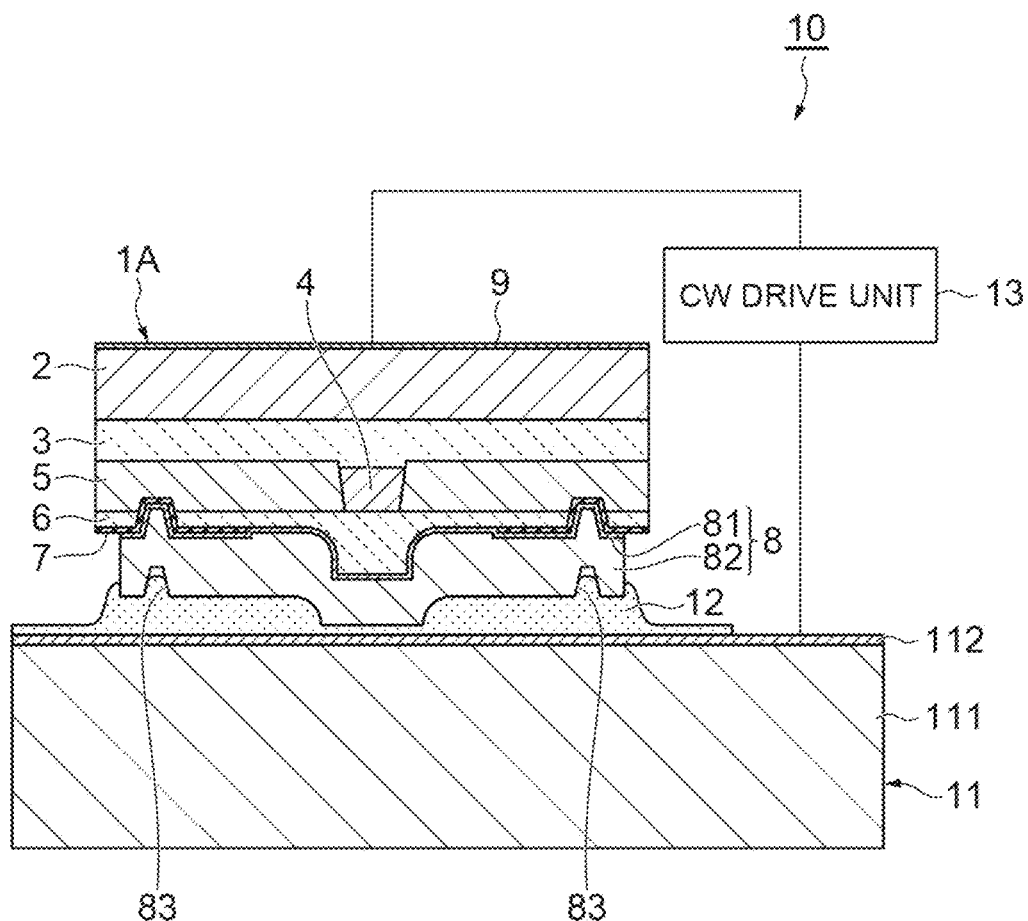
FIG. 7 is a cross-sectional view of a quantum-cascade laser device.

As shown in FIG. 7, a quantum-cascade laser device 10 includes a quantum-cascade laser element 1A, a support member 11, a joining material 12, and a CW drive unit (drive unit) 13. The quantum-cascade laser element 1A has the same configuration as that of the quantum-cascade laser element 1 described above except that the wires WR are not provided.

The support member 11 includes a body portion 111 and an electrode pad 112. The support member 11 is, for example, a sub-mount in which the body portion 111 is made of AlN. The support member 11 supports the quantum-cascade laser element 1A in a state where the semiconductor mesa 4 is located on a support member 11 side with respect to the semiconductor substrate 2 (namely, an epi-side-down state). Incidentally, in a quantum-cascade laser device including the quantum-cascade laser element 1 described above, the support member 11 can support the quantum-cascade laser element 1 in a state where the semiconductor mesa 4 is located opposite to the support member 11 with respect to the semiconductor substrate 2 (namely, an epi-side-up state).

The joining material 12 joins the electrode pad 112 of the support member 11 and the first electrode 8 of the quantum-cascade laser element 1A in the epi-side-down state. The joining material 12 is, for example, a solder made of AuSn. The joining material 12 enters the pair of recessed portions 83 formed in the plating layer 82 of the first electrode 8. A thickness of a portion of the joining material 12 between the electrode pad 112 and the first electrode 8 is, for example, approximately several μm.

The CW drive unit 13 drives the quantum-cascade laser element 1A such that the quantum-cascade laser element 1A continuously oscillates laser light. The CW drive unit 13 is electrically connected to each of the electrode pad 112 of the support member 11 and the second electrode 9 of the quantum-cascade laser element 1A. In order to electrically connect the CW drive unit 13 to each of the electrode pad 112 and the second electrode 9, wire bonding is performed on each of the electrode pad 112 and the second electrode 9.

In the quantum-cascade laser device 10, a heat sink (not shown) is provided on the support member 11 side. For this reason, since the quantum-cascade laser element 1A is mounted on the support member 11 in the epi-side-down state, the heat dissipation of the semiconductor mesa 4 can be improved. When the quantum-cascade laser element 1A is driven to continuously oscillate the laser light, an epi-side-down configuration is effective. Particularly, when the active layer 41 is configured to oscillate laser light having a relatively short center wavelength (for example, a center wavelength of any value of 4 μm to 6 μm) in a mid-infrared region and the quantum-cascade laser element 1A is driven to continuously oscillate the laser light, the epi-side-down configuration is effective. Incidentally, the reason the quantum-cascade laser element 1A can be mounted in the epi-side-down state is that a surface of the first electrode 8 is formed substantially flat by forming the upper cladding layer 6 and the first electrode 8 on a plane formed by the surface 5*a* of the embedding layer 5 and the top surface 4*a* of the semiconductor mesa 4.

[Functions and Effects]

The quantum-cascade laser element 1 includes the embedding layer 5 formed to interpose the semiconductor mesa 4 along the X-axis direction (width direction of the semiconductor substrate 2). Accordingly, heat generated in the active layer 41 can be effectively dissipated. In addition, the pair of groove portions 68 extending along the Y-axis direction (light waveguide direction) are formed in the surface 6*a* on the first side S1 (side opposite to the semiconductor substrate 2) of the upper cladding layer 6. The pair of groove portions 68 are disposed in the two outer regions P2 respectively when the upper cladding layer 6 is equally divided into the four regions P1 and P2 in the X-axis direction. The metal layer 81 enters each of the groove portions 68. Since the metal layer 81 enters each of the groove portions 68, the bond strength between the metal layer 81 and the upper cladding layer 6 can be improved. As a result, the peeling or degradation of the metal layer 81 can be suppressed, and the stability of the laser element can be improved. Particularly, since the metal layer 81 enters each of the groove portions 68 in the outer regions P2 in which the peeling or the like of the metal layer 81 is likely to occur, the peeling or the like of the metal layer 81 can be effectively suppressed. In addition, since the pair of groove portions 68 are disposed in the outer regions P2, a width of a portion between the pair of groove portions 68 in the upper cladding layer 6 can be widened. As a result, heat dissipation can be further improved. Therefore, according to the quantum-cascade laser element 1, an improvement in heat dissipation and an improvement in stability can be achieved. As a result, even when the quantum-cascade laser element 1 is driven to continuously oscillate the laser light having a relatively short center wavelength (for example, a center wavelength of any value of 4 μm to 6 μm) in the mid-infrared region, an improvement in heat dissipation and the suppression of the oscillation of the high-order mode can be sufficiently achieved, and a high yield rate can be realized. Incidentally, increasing a drive voltage is required to oscillate laser light having a center wavelength of 6 μm or less in quantum-cascade laser, but when the drive voltage is increased, the amount of generated heat is increased. For this reason, in order to realize continuous oscillation, securing good heat dissipation is required.

Each of the groove portions 68 reaches the embedding layer 5. Accordingly, the peeling or the like of the metal layer 81 can be more effectively suppressed. In addition, the upper cladding layer 6 is electrically separated by the pair of groove portions 68. Accordingly, when the quantum-cascade laser element 1 is obtained by cleaving a semiconductor wafer including a plurality of portions, each of which becomes the quantum-cascade laser element 1, a plurality of the quantum-cascade laser elements 1 can be individually inspected electrically and optically in a state of a laser bar in which the elements are connected only in a lateral direction before cleavage.

The recessed portions 83 are formed in the surface 82a on the first side S1 of the plating layer 82. Accordingly, when the quantum-cascade laser element 1A is joined to the support member 11 by the joining material 12, the recessed portions 83 can function as escape portions of the joining material 12, and the joining material 12 can be prevented from creeping up side surfaces of the quantum-cascade laser element 1A.

The pair of recessed portions 83 overlap the pair of groove portions 68 respectively when viewed in the Z-axis direction. The recessed portions 83 can be easily formed by forming the metal layer 81 and the plating layer 82 on the upper cladding layer 6 including the groove portions 68.

The opening 7a that exposes the upper cladding layer 6 from the dielectric layer 7 in the first region R1 overlapping the semiconductor mesa 4 when viewed in the Z-axis direction is formed in the dielectric layer 7 disposed between the upper cladding layer 6 and the metal layer 81. The metal layer 81 is in contact with the upper cladding layer 6 through the opening 7a. Accordingly, bond strength between the metal layer 81 and the upper cladding layer 6 can be improved by the dielectric layer 7, and the peeling or the like of the metal layer 81 can be further suppressed.

The dielectric layer 7 enters each of the groove portions 68. Accordingly, the peeling or the like of the metal layer 81 can be even further suppressed.

The width W3 of the opening 7a in the X-axis direction is more than or equal to two times the width W2 of the semiconductor mesa 4. Accordingly, a region in which the metal layer 81 is in contact with the upper cladding layer 6 can be widened, and heat dissipation can be even further improved.

The width W2 of the opening 7a in the X-axis direction is more than or equal to ten times the thickness of the upper cladding layer 6 (thickness T1 of the first portion 61). Accordingly, a region in which the metal layer 81 is in contact with the upper cladding layer 6 can be widened, and heat dissipation can be even further improved.

The connection position between the metal layer 81 and each of the wires WR overlaps the dielectric layer 7 when viewed in the Z-axis direction. Accordingly, the peeling or the like of the metal layer 81 caused by a tensile stress that the wires WR act on the metal layer 81 can be suppressed.

The thickness of the upper cladding layer 6 may be thinner in the second regions R2 located outside the first region R1 in the X-axis direction than in the first region R1 of which at least a part overlaps the semiconductor mesa 4 when viewed in the Z-axis direction, and the metal layer 81 may extend over the first region R1 and over the second regions R2. In the quantum-cascade laser element 1, in order to stably output light of a basic mode having a peak of intensity at a central portion of the ridge portion in the width direction, suppressing the oscillation of light of a high-order mode having a peak of intensity on both sides of the central portion is required. When the embedding layer 5 that interposes the semiconductor mesa 4 along the width direction is provided, since heat dissipation can be improved but a light confinement effect of the embedding layer 5 is weak, the light of the high-order mode is likely to be oscillated. In this regard, in the quantum-cascade laser element 1, the thickness of the upper cladding layer 6 is thinner in the second regions R2 located outside the first region R1 in the X-axis direction than in the first region R1 of which at least a part overlaps the semiconductor mesa 4 when viewed in the Z-axis direction, and the metal layer 81 extends over the first region R1 and over the second regions R2. Accordingly, the light of the high-order mode can be absorbed by the metal layer 81 formed to reach the second regions R2, and the oscillation of the high-order mode can be suppressed.

Figure 8:
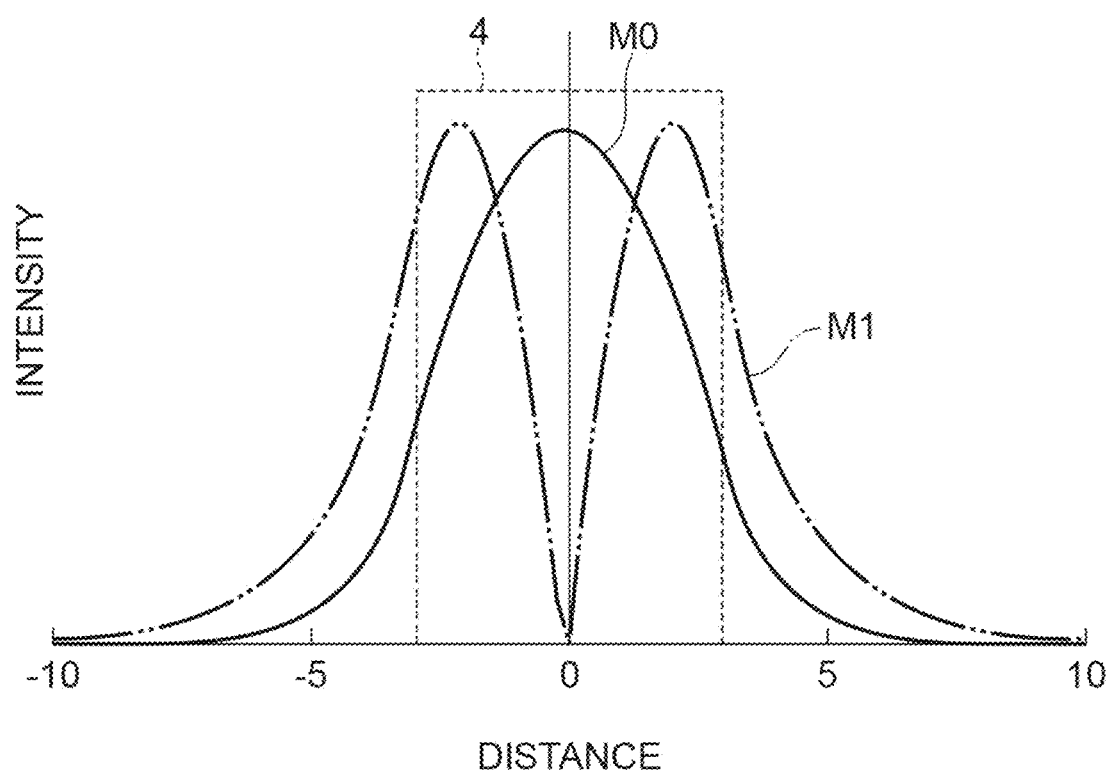
FIG. 8 is a graph showing an example of an electric field intensity distribution in the quantum-cascade laser element.
Figure 9:
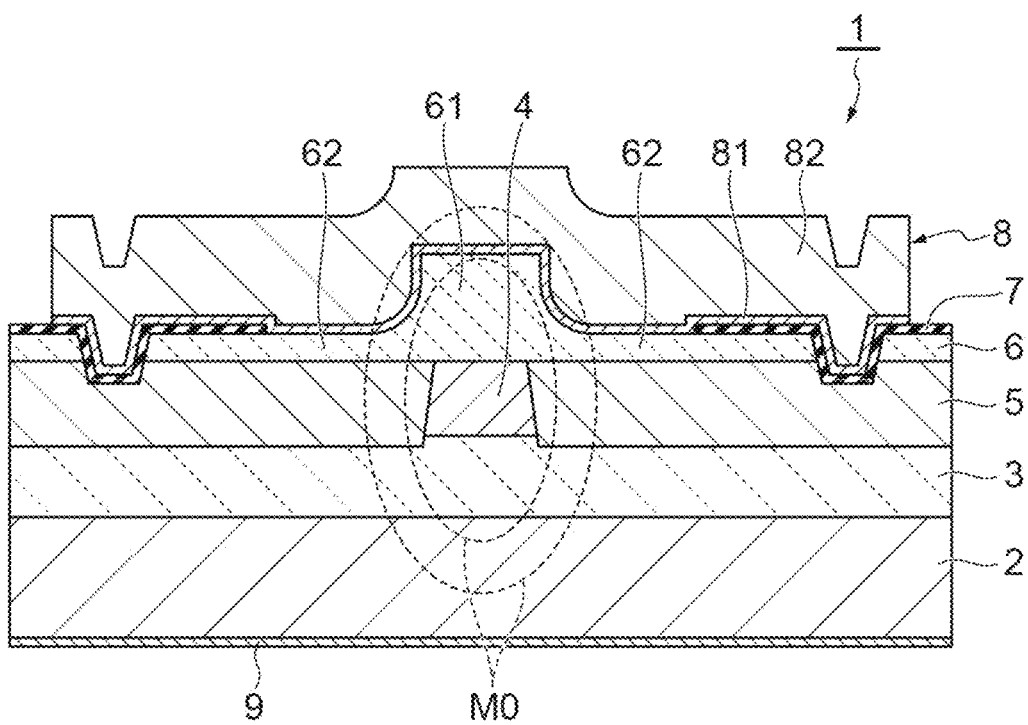
FIG. 9(a) is a view showing an example of an extension of a basic mode.
FIG. 9(b) is a view showing an example of an extension of a primary mode.
Figure 9:
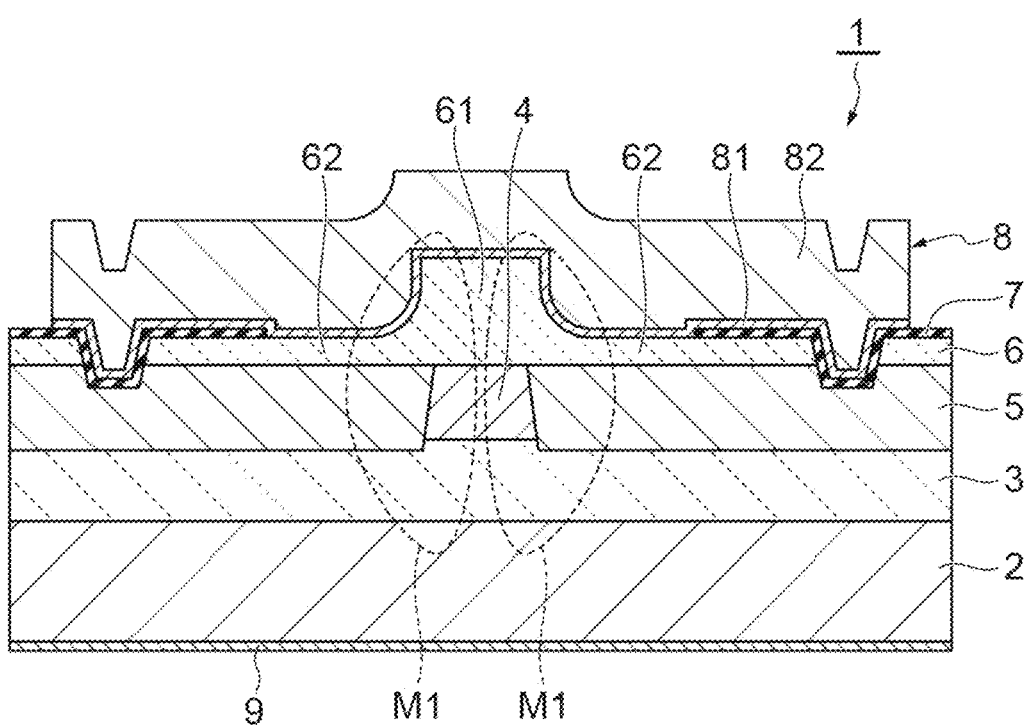

Here, an effect of suppressing the oscillation of a high-order transverse mode will be further described with reference to FIGS. 8 and 9. FIG. 8 shows an electric field intensity distribution in the width direction of the semiconductor substrate 2 with the center of the semiconductor mesa 4 set as an origin of an X axis. An intensity distribution of a basic mode M0 is shown by a solid line, and an intensity distribution of a primary mode M1 is shown by an alternate long and two short dashed line. As shown in FIG. 8, light of the basic mode M0 has a peak of intensity in the vicinity of the center of the semiconductor mesa 4, and light of the primary mode M1 has a peak of intensity on both sides of the center of the semiconductor mesa 4.

FIG. 9(a) is a view showing an extension of the basic mode M0 when viewed in the light waveguide direction A, and FIG. 9(b) is a view showing an extension of the primary mode M1 when viewed in the light waveguide direction A. As shown in FIGS. 9(a) and 9(b), each of the basic mode M0 and the primary mode M1 has a substantially elliptical extension of which a major axis is along the Z-axis direction. As described above, since the metal layer 81 that easily absorbs light is formed to reach the second regions R2 (on the second portions 62), the oscillation of the light of the primary mode M1 can be suppressed while suppressing loss of the light of the basic mode M0 (while confining the light of the basic mode M0).

The width W1 of the upper cladding layer 6 in the first region R1 (first portion 61 of the upper cladding layer 6) is more than or equal to two times the width W2 of the semiconductor mesa 4. Accordingly, the oscillation of the high-order mode can be suppressed while suppressing a loss in the basic mode.

The width W1 of the upper cladding layer 6 in the first region R1 is less than or equal to four times the width W2 of the semiconductor mesa 4. Accordingly, the oscillation of the high-order mode can be effectively suppressed.

The thickness T2 of the upper cladding layer 6 in the second regions R2 (second portions 62 of the upper cladding layer 6) is less than or equal to half the thickness T1 of the upper cladding layer 6 in the first region R1. Accordingly, the oscillation of the high-order mode can be even more effectively suppressed.

The surface 6a on the first side S1 of the upper cladding layer 6 includes the inclined surfaces 63a, each of which is formed at the boundary portion between the first region R1 and the second region R2, and the inclined surfaces 63a are inclined to go outward as approaching the semiconductor substrate 2 when viewed in the Y-axis direction. When viewed in the Y-axis direction, the inclined surfaces 63a are curved to protrude toward the active layer 41. Accordingly, the uniformity of the metal layer 81 formed on the inclined surfaces 63a can be improved, and the occurrence of a variation in a characteristic of suppressing the oscillation of the high-order mode caused by the non-uniformity of the metal layer 81 can be suppressed. In addition, the metal layer 81 on the inclined surfaces 63a can be shaped to be along the basic mode. As a result, the above effect that the oscillation of the high-order mode can be suppressed while suppressing a loss in the basic mode is remarkably exhibited.

In the quantum-cascade laser device 10, the joining material 12 joins the electrode pad 112 and the plating layer 82 in a state where the semiconductor mesa 4 is located on the support member 11 side with respect to the semiconductor substrate 2 and the joining material 12 enters the recessed portions 83. Accordingly, since the recessed portions 83 function as escape portions of the joining material 12, the joining material 12 is prevented from creeping up the side surfaces of the quantum-cascade laser element 1A. In addition, since the dielectric layer 7 reaches the outer edge of the upper cladding layer 6 (outer edge of the semiconductor substrate 2), the joining material 12 can be further prevented from creeping up to a surface 2b side of the semiconductor substrate 2.

The CW drive unit 13 drives the quantum-cascade laser element 1A to continuously oscillate laser light. In this case, a lot of heat is generated in the active layer 41. In this regard, in the quantum-cascade laser device 10, since heat dissipation is improved as described above, heat generated in the active layer 41 can be well dissipated.

Modification Example

Figure 10:
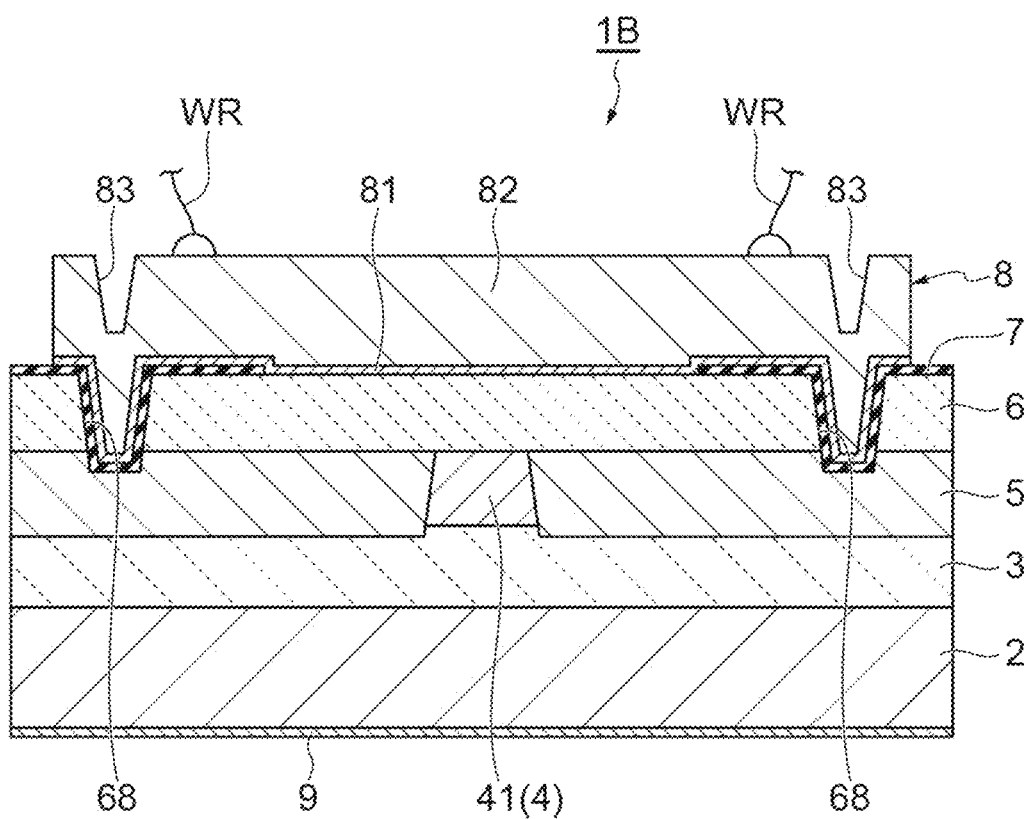
FIG. 10 is a cross-sectional view of a quantum-cascade laser element according to a modification example.

In a quantum-cascade laser element 1B according to a modification example shown in FIG. 10, the thickness of the upper cladding layer 6 is uniform (unchanged) except for portions at where the pair of groove portions 68 are formed. The quantum-cascade laser element 1B has the same configuration as that of the quantum-cascade laser element 1 of the embodiment except for that point. Even in the quantum-cascade laser element 1B, similarly to the quantum-cascade laser element 1 of the embodiment, an improvement in heat dissipation and an improvement in stability can be achieved.

In addition, since a portion of the upper cladding layer 6 which is formed thick is wide, heat dissipation can be even further improved.

The present disclosure is not limited to the above-described embodiment and the modification example. The material and the shape of each configuration are not limited to the material and the shape described above, and various materials and shapes can be adopted. Another known quantum-cascade structure is applicable to the active layer 41. The upper guide layer may not have a diffraction grating structure functioning as a distributed feedback structure.

The outer edge of the metal layer 81 in the Y-axis direction may reach the outer edge of the dielectric layer 7. In this case, heat dissipation on the first end surface 4c and on the second end surface 4d can be improved. The plating layer 82 may not be provided, and only the metal layer 81 may form the first electrode 8. In this case, the wires WR may be connected to a surface on the first side S1 of the metal layer 81.

The thickness T2 of the upper cladding layer 6 (second portions 62) in the second regions R2 may be 0. In other words, the second portions 62 may not be provided, and the upper cladding layer 6 may include only the first portion 61 located in the first region R1. Even in this case, the thickness of the upper cladding layer 6 can be regarded as being thinner in the second regions R2 than in the first region R1. In this case, the metal layer 81 is formed over the first portion 61 of the upper cladding layer 6 and over the embedding layer 5. With such a modification example, similarly to the embodiment, an improvement in heat dissipation and the suppression of the oscillation of the high-order mode can be achieved.

The surface 5a on the first side S1 of the embedding layer 5 may be located on the first side S1 with respect to the top surface 4a of the semiconductor mesa 4 or may be located on the second side S2 with respect to the top surface 4a. The width W1 of the first portion 61 of the upper cladding layer 6 may be equal to the width W2 of the semiconductor mesa 4 or may be smaller than the width W2 of the semiconductor mesa 4. At least a part of the first region R1 may overlap the semiconductor mesa 4 when viewed in the Z-axis direction, and the entirety of the first region R1 may overlap the semiconductor mesa 4. In this case, the width W1 of the first portion 61 is less than or equal to two times the width W2 of the semiconductor mesa 4. The connection portion 63 may not be formed at the boundary portion between the first portion 61 and each of the second portions 62. The groove portions 68 may not reach the embedding layer 5. The groove portions 68 may penetrate through the upper cladding layer 6 and the embedding layer 5 to reach the lower cladding layer 3.

REFERENCE SIGNS LIST 1, 1A, 1B: quantum-cascade laser element, 2: semiconductor substrate, 4: semiconductor mesa, 41: active layer, 5: embedding layer, 6: upper cladding layer, 6a: surface, 63a: inclined surface, 68: groove portion, 7: dielectric layer, 7a: opening, 10: quantum-cascade laser device, 11: support member, 112: electrode pad, 12: joining material, 13: CW drive unit (drive unit), 81: metal layer, 82: plating layer, 83: recessed portion, A: light waveguide direction, P1: inner region, P2: outer region, R1: first region, R2: second region, WR: wire.

The invention claimed is:

1. A quantum-cascade laser element comprising:
a semiconductor substrate;

a semiconductor mesa formed on the semiconductor substrate to include an active layer having a quantum-cascade structure and to extend along a light waveguide direction;

an embedding layer formed to interpose the semiconductor mesa along a width direction of the semiconductor substrate;

a cladding layer formed over the semiconductor mesa and over the embedding layer; and a metal layer formed on the cladding layer, wherein a pair of groove portions extending along the light waveguide direction are formed in a surface of the cladding layer on a side opposite to the semiconductor substrate, the pair of groove portions are disposed in two outer regions respectively when the cladding layer is equally divided into four regions in the width direction of the semiconductor substrate, the metal layer enters the pair of groove portions, the pair of groove portions reach the embedding layer, and bottom portions of the pair of groove portions are positioned within the embedding layer.

2. The quantum-cascade laser element according to claim 1, further comprising:

a plating layer formed on the metal layer, wherein a recessed portion is formed in a surface of the plating layer on a side opposite to the semiconductor substrate.

3. The quantum-cascade laser element according to claim 2, wherein a pair of the recessed portions are provided, and the pair of recessed portions overlap the pair of groove portions respectively when viewed in a thickness direction of the semiconductor substrate.

4. The quantum-cascade laser element according to claim 1, further comprising:

a dielectric layer disposed between the cladding layer and the metal layer, wherein an opening that exposes the cladding layer from the dielectric layer in a region overlapping the semiconductor mesa when viewed in a thickness direction of the semiconductor substrate is formed in the dielectric layer, and the metal layer is in contact with the cladding layer through the opening.

5. The quantum-cascade laser element according to claim 4, wherein the dielectric layer enters the pair of groove portions.

6. The quantum-cascade laser element according to claim 4, wherein a width of the opening in the width direction of the semiconductor substrate is more than or equal to two times a width of the semiconductor mesa.

7. The quantum-cascade laser element according to claim 4, wherein a width of the opening in the width direction of the semiconductor substrate is more than or equal to ten times a thickness of the cladding layer.

8. The quantum-cascade laser element according to claim 4, further comprising:

a wire made of metal, that is electrically connected to the metal layer, and wherein a connection position between the metal layer and the wire overlaps the dielectric layer when viewed in the thickness direction of the semiconductor substrate.

9. The quantum-cascade laser element according to claim 1, wherein a thickness of the cladding layer is thinner in a second region located outside a first region in the width direction of the semiconductor substrate than in the first region of which at least a part overlaps the semiconductor mesa when viewed in a thickness direction of the semiconductor substrate, and the metal layer extends over the first region and the second region.

10. The quantum-cascade laser element according to claim 9, wherein a width of the cladding layer in the first region is more than or equal to a width of the semiconductor mesa.

11. The quantum-cascade laser element according to claim 9, wherein a width of the cladding layer in the first region is less than or equal to four times a width of the semiconductor mesa.

12. The quantum-cascade laser element according to claim 9, wherein the thickness of the cladding layer in the second region is less than or equal to half the thickness of the cladding layer in the first region.

13. The quantum-cascade laser element according to claim 9, wherein the surface of the cladding layer on a side opposite to the semiconductor substrate includes an inclined surface formed at a boundary portion between the first region and the second region, and when viewed in the light waveguide direction, the inclined surface is inclined to go outward as approaching the semiconductor substrate.

14. The quantum-cascade laser element according to claim 13, wherein when viewed in the light waveguide direction, the inclined surface is curved to protrude toward the active layer.

15. The quantum-cascade laser element according to claim 1, wherein a thickness of the cladding layer is uniform except for a portion at which the pair of groove portions are formed.

16. A quantum-cascade laser device comprising:

the quantum-cascade laser element according to claim 1; and a drive unit that drives the quantum-cascade laser element.

17. The quantum-cascade laser device according to claim 16, further comprising:

a support member including an electrode pad and supporting the quantum-cascade laser element; and a joining material that joins the support member and the quantum-cascade laser element, wherein the quantum-cascade laser element includes a plating layer formed on the metal layer, a recessed portion is formed in a surface of the plating layer on a side opposite to the semiconductor substrate, and the joining material joins the electrode pad and the plating layer in a state where the semiconductor mesa is located on a side of the support member with respect to the semiconductor substrate and the joining material enters the recessed portion.

18. The quantum-cascade laser device according to claim 16, wherein the drive unit drives the quantum-cascade laser element to continuously oscillate laser light.

\* \* \* \* \*